(12) United States Patent
Tanaka et al.

(10) Patent No.: US 8,151,584 B2
(45) Date of Patent: Apr. 10, 2012

(54) REFRIGERATION SYSTEM (75) Inventors: Shigeto Tanaka, Osaka (JP); Noriyasu Kawakatsu, Osaka (JP)

(73) Assignee: Daikin Industries Ltd., Osaka (JP)

( * ) Notice: Subject to any disclaimer, the term of this patent is extended or adjusted under 35 U.S.C. 154(b) by 1099 days.

(21) Appl. No.: 11/989,522

(22) PCT Filed: Jul. 20, 2006

(86) PCT No.: PCT/JP2006/314420
§ 371 (c)(1),
(2), (4) Date: Jan. 28, 2008

(87) PCT Pub. No.: WO2007/013353
PCT Pub. Date: Feb. 1, 2007

(65) Prior Publication Data
US 2009/0025410 A1    Jan. 29, 2009

(30) Foreign Application Priority Data

Jul. 29, 2005  (JP) .................... 2005-221941
Feb. 1, 2006   (JP) .................... 2006-024684

(51) Int. Cl.
*F25B 1/00*   (2006.01)
*F25D 21/00*  (2006.01)

(52) U.S. Cl. ........................... 62/228.1; 62/80

(58) Field of Classification Search ............. 62/228.1, 62/228.5, 227, 217, 222–224, 82, 80, 246, 62/196.1
See application file for complete search history.

(56) References Cited

U.S. PATENT DOCUMENTS

| 2,535,462 | A   | * | 12/1950 | Stoelting et al. | 62/225 |
| 4,494,382 | A   | * | 1/1985  | Raymond | 62/160 |
| 4,774,813 | A   | * | 10/1988 | Yokoyama | 62/81 |
| 6,058,729 | A   | * | 5/2000  | Lifson et al. | 62/217 |
| 6,298,673 | B1  | * | 10/2001 | Fung et al. | 62/82 |
| 6,311,512 | B1  | * | 11/2001 | Fung et al. | 62/272 |
| 6,354,092 | B1  | * | 3/2002  | Young et al. | 62/83 |
| 6,385,981 | B1  | * | 5/2002  | Vaisman | 62/196.3 |
| 6,601,396 | B2  | * | 8/2003  | Bair et al. | 62/155 |
| 6,679,080 | B2  | * | 1/2004  | Chiang et al. | 62/246 |
| 6,772,597 | B1  | * | 8/2004  | Zentner et al. | 62/80 |
| 7,885,961 | B2  | * | 2/2011  | Horowitz et al. | 707/737 |
| 2006/0059929 | A1 | * | 3/2006 | Sakitani et al. | 62/228.1 |
| 2009/0025410 | A1 | * | 1/2009 | Tanaka et al. | 62/228.1 |
| 2009/0158761 | A1 | * | 6/2009 | Wakamoto et al. | 62/175 |
| 2010/0293977 | A1 | * | 11/2010 | Tanaka | 62/186 |

FOREIGN PATENT DOCUMENTS

| JP | 61-191856 A | 8/1986 |
| JP | 62-94778 A  | 5/1987 |
| JP | 11-7576 A   | 1/1999 |
| JP | 2000-88421 A | 3/2000 |
| JP | 2002-327964 A | 11/2002 |
| JP | 2005-106429 A | 4/2005 |

* cited by examiner

*Primary Examiner* — Kenneth Rinehart
*Assistant Examiner* — Timothy K Trieu
(74) *Attorney, Agent, or Firm* — Birch, Stewart, Kolasch & Birch, LLP (57) ABSTRACT

When during a first action of a refrigeration system the internal cold storage temperature is held at a desired temperature by an evaporator, the refrigeration system performs a second action of increasing the cooling capacity of the evaporator to decrease the internal cold storage temperature. When during the second action the internal cold storage temperature reaches a minimum temperature Tmin, the refrigeration system stops a compressor and performs a third action. When during the third action the internal cold storage temperature reaches a maximum temperature Tmin, the refrigeration system drives the compressor and performs the first action.

12 Claims, 4 Drawing Sheets

REFRIGERATION SYSTEM

TECHNICAL FIELD

This invention relates to a refrigeration system with a cooling heat exchanger for cooling the interior of a cold storage and particularly relates to a method for energy saving operation of the refrigeration system.

BACKGROUND ART

Refrigeration systems are conventionally known for cooling the interior of a cold storage, such as a chiller or a freezer.

For example, Patent Document 1 discloses a refrigeration system for cooling the interior of a cold storage in a container for use in sea transport or other transports. This refrigeration system includes a refrigerant circuit in which a compressor, a condenser, an expansion valve and a cooling heat exchanger (evaporator) are connected. The refrigerant circuit in the refrigeration system operates in a vapor compression refrigeration cycle by circulating refrigerant therethrough. As a result, the refrigerant flowing through the cooling heat exchanger takes heat from air in the cold storage to evaporate and thereby cools the air in the cold storage. The refrigeration system is capable of a freezing operation for freezing stored goods in the container by cooling the air in the cold storage with temperatures below zero degrees Celsius and a chilling operation for chilling stored goods in the container by cooling the air in the cold storage with temperatures above zero degrees Celsius.

Patent Document 1: Published Japanese Patent Application No. 2002-327964

DISCLOSURE OF THE INVENTION

Problem to Be Solved by the Invention

For example, the above refrigeration system may be required to keep the internal cold storage temperature with high accuracy, for example, within about ±0.5° C., depending on stored goods in the container. Therefore, conventional refrigeration systems keep their compressors always on giving priority to keeping the accuracy of the internal cold storage temperature. However, once the air in the cold storage of the container becomes cool, the cooling load on the cooling heat exchanger does not so drastically change. In addition, it is highly unlikely that the outside temperature acting on the cooling load changes so abruptly. Hence, in most cases, refrigeration systems can keep the internal cold storage temperature constant even if they restrain the cooling capacity of their cooling heat exchangers. Even in such cases, however, conventional refrigeration systems keep their compressors consistently on to consume more energy than required to drive the compressors.

The present invention has been made in view of the foregoing points and an object thereof is that the refrigeration system for cooling the interior of a cold storage by means of a cooling heat exchanger has the ability to keep the internal cold storage temperature within a desired temperature range and the ability to provide an operation excellent in energy saving performance.

Means to Solve the Problem

A first aspect of the invention is directed to a refrigeration system that includes a refrigerant circuit (10) in which a compressor (11) and a cooling heat exchanger (14) for cooling the interior of a cold storage are connected, and that operates in a refrigeration cycle by circulating refrigerant through the refrigerant circuit (10). Furthermore, the refrigeration system includes a capacity regulator (35) for regulating the cooling capacity of the cooling heat exchanger (14) to bring the internal cold storage temperature to a desired temperature, and is configured to be capable of energy saving operation including: a first action in which the compressor (11) is driven while the cooling capacity of the cooling heat exchanger (14) is regulated by the capacity regulator (35); a second action in which when the internal cold storage temperature is held at the desired temperature during the first action, the cooling capacity of the cooling heat exchanger (14) is increased by the capacity regulator (35) to lower the internal cold storage temperature to a lower limit of a desired temperature range containing the desired temperature and the compressor (11) is then stopped; and a third action in which when the internal cold storage temperature reaches an upper limit of the desired temperature range after the stop of the compressor (11) by the second action, the compressor (11) is activated to restart the first action.

The refrigeration system according to the first aspect of the invention operates in a vapor compression refrigeration cycle by circulating refrigerant through the refrigerant circuit (10). As a result, the refrigerant flowing through the cooling heat exchanger (14) takes heat from air in the cold storage to evaporate, thereby cooling the interior of the cold storage.

During the time, the refrigeration system according to this aspect of the invention performs an energy saving operation of intermittently driving the compressor (11). Specifically, in the energy saving operation, the following first to third actions are repeated. In the refrigeration system, a desired value of the internal cold storage temperature and the upper and lower limits of a desired temperature range (allowable temperature range) containing the desired temperature are set.

First, in the first action, the compressor (11) is driven and the cooling capacity of the cooling heat exchanger (14) is regulated by the capacity regulator (35). As a result, the internal cold storage temperature gradually approaches the desired temperature. When the internal cold storage temperature is held at the desired temperature by the first action, the second action is carried out.

In the second action, the compressor (11) is driven and the cooling capacity of the cooling heat exchanger (14) is increased by the capacity regulator (35). As a result, the internal cold storage temperature gradually decreases. Then, when during the second action the internal cold storage temperature reaches the lower limit, the compressor (11) is stopped and the third action is carried out.

In the third action, the compressor (11) is held stopped. Therefore, the refrigerant circuit (10) does not operate in a refrigeration cycle, whereby the cooling of the interior of the cold storage by the cooling heat exchanger (14) is substantially stopped. As a result, the internal cold storage temperature gradually increases and then rises above the desired temperature. Thereafter, when the internal cold storage temperature further rises and reaches the upper limit, the compressor (11) is activated again to restart the first action. When the first action is restarted, the internal cold storage temperature gradually approaches the desired temperature again.

A second aspect of the invention is the refrigeration system according to the first aspect of the invention, wherein the capacity regulator comprises a flow regulator valve (35), connected in the refrigerant circuit (10), for regulating the amount of flow of refrigerant to be sucked into the compressor (11), and the refrigeration system during the second action is configured to make the opening of the flow regulator valve (35) larger than during the first action to increase the cooling capacity of the cooling heat exchanger (14).

In the second aspect of the invention, a flow regulator valve (35) is connected in the refrigerant circuit (10). The flow regulator valve (35) constitutes a capacity regulator for regulating the cooling capacity of the cooling heat exchanger (14) by regulating the amount of flow of refrigerant to be sucked into the compressor (11).

Specifically, during the first action, the opening of the flow regulator valve (35) is regulated, whereby the refrigerant circulation amount in the refrigerant circuit (10) is regulated. In this case, when the refrigerant circulation amount is regulated by throttling the opening of the flow regulator valve (35), the refrigerant is on the wet side over substantially the entire area of the cooling heat exchanger (14) serving as an evaporator. If the cooling capacity of the evaporator were regulated by regulating the opening of the expansion valve on the inflow side of the evaporator, refrigerant flowing through the evaporator would be on the dry side and would be likely to cause temperature variations from inflow end to outflow end of the evaporator. On the other hand, when the cooling capacity of the cooling heat exchanger (14) is regulated while the opening of the flow regulator valve (35) is throttled, this uniformizes the temperature distribution of refrigerant from inflow end to outflow end of the cooling heat exchanger (14). As a result, the air in the cold storage is cooled to a relatively uniform temperature by the cooling heat exchanger (14).

When the internal cold storage temperature is held at the desired temperature by the above regulation of the opening of the flow regulator valve (35) in the first action, the second action is carried out. In the second action, since the opening of the flow regulator valve (35) is regulated to a larger degree than during the first action, the refrigerant circulation amount in the refrigerant circuit (10) is increased to increase the cooling capacity of the cooling heat exchanger (14). Then, when during the second action the internal cold storage temperature reaches the lower limit, the same third action as in the first aspect of the invention is carried out.

A third aspect of the invention is the refrigeration system according to the second aspect of the invention, wherein during the third action the opening of the flow regulator valve (35) is held as it is at the end of the second action.

In the third aspect of the invention, when the opening of the flow regulator valve (35) is made larger by the second action until the internal cold storage temperature reaches the lower limit, the opening of the flow regulator valve (35) at that time is held as it is, the compressor (11) is stopped and a transition to the third action is made. The opening of the flow regulator valve (35) is held as it is until the internal cold storage temperature reaches the upper limit during the third action to restart the compressor (11). Therefore, the opening of the flow regulator valve (35) at the start of the first action is the same as the opening at the end of the last second action during which the cooling capacity of the cooling heat exchanger (14) is increased to cool the air in the cold storage. As a result, a sufficient refrigerant circulation amount can be ensured from the start of the first action at which the internal cold storage temperature reaches the upper limit to restart the compressor (11). Therefore, the air in the cold storage is promptly cooled so that the internal cold storage temperature promptly approaches the desired temperature.

A fourth aspect of the invention is the refrigeration system according to the first aspect of the invention, further including a temperature correction means for raising the lower limit when the internal cold storage temperature falls below the lower limit during the third action.

In the fourth aspect of the invention, if, for example, under conditions of relatively low outside temperatures, the internal cold storage temperature falls below the lower limit even after the internal cold storage temperature has once reached the lower limit to provide a transition to the third action, the temperature correction means corrects the lower limit by raising it. As a result, in the next and later second actions, when the internal cold storage temperature reaches the corrected lower limit, a transition to the third action is made. Therefore, in the next and later third actions, the internal cold storage temperature changes within a slightly higher temperature range and, therefore, can be avoided from falling below the initial desired temperature range.

A fifth aspect of the invention is the refrigeration system according to the first aspect of the invention, further including a temperature correction means for lowering the upper limit when the internal cold storage temperature rises above the upper limit during the first action.

In the fifth aspect of the invention, if, for example, under conditions of relatively high outside temperatures, the internal cold storage temperature rises above the upper limit even after the internal cold storage temperature has once reached the upper limit to provide a transition to the first action, the temperature correction means corrects the upper limit by lowering it. As a result, in the next and later third actions, when the internal cold storage temperature reaches the corrected upper limit, a transition to the first action is made. Therefore, in the next and later first actions, the internal cold storage temperature changes within a slightly lower temperature range and, therefore, can be avoided from rising above the initial desired temperature range.

A sixth aspect of the invention is the refrigeration system according to the first aspect of the invention, further including an internal fan (16), contained in the cold storage, for feeding air to the cooling heat exchanger (14), the internal fan (16) being rotated during the third action at a lower speed than during the first and second actions.

In the sixth aspect of the invention, during the first and second actions in the energy saving operation mode, the internal fan (16) is driven at a normal rotational speed. As a result, heat is exchanged between refrigerant flowing through the cooling heat exchanger (14) and air in the cold storage fed thereto by the internal fan (16). Therefore, the refrigerant takes heat from the air in the cold storage to evaporate, thereby cooling the interior of the cold storage.

On the other hand, during the third action in which the compressor (11) is stopped, the internal fan (16) is driven at a lower rotational speed than during the first and second actions. Therefore, the quantity of heat liberated from the internal fan (16) owing to the driving of the internal fan (16) becomes smaller than during the first and second actions. As a result, the time for the internal cold storage temperature to reach the upper limit during the third action is extended and, therefore, the stopping time of the compressor (11) is also extended. Hence, the power consumption of the refrigeration system during the energy saving operation can be reduced.

A seventh aspect of the invention is the refrigeration system according to the first aspect of the invention, further including an internal fan (16), contained in the cold storage, for feeding air to the cooling heat exchanger (14), the internal fan (16) being deactivated only during the third action.

In the seventh aspect of the invention, during the first and second actions in the energy saving operation mode, the internal fan (16) is driven at a normal rotational speed. As a result, heat is exchanged between refrigerant flowing through the cooling heat exchanger (14) and air in the cold storage fed thereto by the internal fan (16). Therefore, the refrigerant takes heat from the air in the cold storage to evaporate, thereby cooling the interior of the cold storage.

On the other hand, during the third action in which the compressor (11) is stopped, the internal fan (16) is deactivated. Therefore, during the third action, the internal fan (16) liberates no heat, whereby the time for the internal cold storage temperature to reach the upper limit can be further extended. Hence, the power consumption of the refrigeration system during the energy saving operation can be further reduced.

An eighth aspect of the invention is directed to a refrigeration system that includes a refrigerant circuit (10) in which a compressor (11) and a cooling heat exchanger (14) for cooling the interior of a cold storage are connected, and that operates in a refrigeration cycle by circulating refrigerant through the refrigerant circuit (10). Furthermore, the refrigeration system includes a capacity regulator (35) for regulating the cooling capacity of the cooling heat exchanger (14) to bring the internal cold storage temperature to a desired temperature and an internal fan (16), contained in the cold storage, for feeding air to the cooling heat exchanger (14), and the refrigeration system is configured to be capable of energy saving operation including: a first action in which the compressor (11) is driven while the cooling capacity of the cooling heat exchanger (14) is regulated by the capacity regulator (35); a second action in which when the internal cold storage temperature is held at the desired temperature during the first action, the compressor (11) is stopped; and a third action in which when the internal cold storage temperature reaches an upper limit of a desired temperature range containing the desired temperature after the stop of the compressor (11) by the second action, the compressor (11) is activated to restart the first action, and the refrigeration system is further configured to rotate, during the third action, the internal fan (16) at a lower speed than during the first action.

The refrigeration system according to the eighth aspect of the invention performs an energy saving operation of intermittently driving the compressor (11). Specifically, in the energy saving operation, the following first to third actions are repeated. In the refrigeration system, at least a desired value of the internal cold storage temperature and the upper limit of a desired temperature range containing the desired temperature are set.

First, in the first action, the compressor (11) is driven and the cooling capacity of the cooling heat exchanger (14) is regulated by the capacity regulator (35). As a result, the internal cold storage temperature gradually approaches the desired temperature. Furthermore, during the first action, the internal fan (16) is driven at a normal rotational speed. When the internal cold storage temperature is held at the desired temperature by the first action, the second action is carried out to stop the compressor (11).

After the compressor (11) is stopped by the second action, the third action is carried out. In the third action, the compressor (11) is held stopped. Therefore, the refrigerant circuit (10) does not operate in a refrigeration cycle, whereby the cooling of the interior of the cold storage by the cooling heat exchanger (14) is substantially stopped. As a result, the internal cold storage temperature gradually increases from the desired temperature. Then, when the internal cold storage temperature reaches the upper limit, the compressor (11) is activated again to restart the first action.

In this aspect of the invention, during the third action in which the compressor (11) is stopped, the internal fan (16) is driven at a lower rotational speed than during the first action. Therefore, the quantity of heat liberated from the internal fan (16) owing to the driving of the internal fan (16) becomes smaller than during the first action. As a result, the time for the internal cold storage temperature to reach the upper limit during the third action is extended and, therefore, the stopping time of the compressor (11) is also extended. Hence, the power consumption of the refrigeration system during the energy saving operation can be reduced.

A ninth aspect of the invention is the refrigeration system according to any one of the first to eighth aspects of the invention, wherein the refrigeration system is configured to be capable of performing a normal operation of continuously driving the compressor (11) while regulating the cooling capacity of the cooling heat exchanger (14) with the capacity regulator (35), further includes a suction temperature sensor (RS) for detecting the temperature of air in the cold storage to be fed to the cooling heat exchanger (14), and is further configured to switch from the normal operation to the energy saving operation when during the normal operation the detected temperature of the suction temperature sensor (RS) falls within a predetermined temperature range containing the desired temperature.

In the refrigeration system according to the ninth aspect of the invention, during the normal operation, the compressor (11) is continuously driven and the cooling capacity of the cooling heat exchanger (14) is regulated to bring the internal cold storage temperature close to the desired temperature. Furthermore, disposed upstream of the cooling heat exchanger (14) is a suction temperature sensor (RS) for measuring the temperature of air in the cold storage to be fed to the cooling heat exchanger (14).

In this aspect of the invention, whether the operation should be switched from normal operation to energy saving operation is determined. Specifically, in the normal operation, a comparison is made between the suction temperature detected by the suction temperature sensor (RS) and the desired temperature. If, in the comparison, the suction temperature is out of the predetermined temperature range containing the desired temperature, the internal cold storage temperature is needed to be brought close to the desired temperature and, therefore, the normal operation is continued. On the other hand, if the suction temperature falls within the predetermined temperature range containing the desired temperature, the internal cold storage temperature is already close to the desired temperature, which eliminates the need to continuously drive the compressor (11). Therefore, a transition from normal operation to energy serving operation is made.

A tenth aspect of the invention is the refrigeration system according to any one of the first to eighth aspects of the invention, wherein the refrigeration system is configured to be capable of performing a normal operation of continuously driving the compressor (11) while regulating the cooling capacity of the cooling heat exchanger (14) with the capacity regulator (35), further includes a blowoff temperature sensor (SS) for detecting the temperature of air in the cold storage having passed through the cooling heat exchanger (14), and is further configured to switch from the normal operation to the energy saving operation when during the normal operation the detected temperature of the blowoff temperature sensor (SS) falls within a predetermined temperature range containing the desired temperature.

In the tenth aspect of the invention, a blowoff temperature sensor (SS) is disposed downstream of the cooling heat exchanger (14). The blowoff temperature sensor (SS) detects the temperature of air in the cold storage after being cooled by the cooling heat exchanger (14).

In this aspect of the invention, whether the operation should be switched from normal operation to energy saving operation is determined, unlike the ninth aspect of the invention, by making a comparison between the blowoff temperature detected by the blowoff temperature sensor (SS) and the desired temperature. Specifically, in the normal operation, a comparison is made between the blowoff temperature detected by the blowoff temperature sensor (SS) and the desired temperature. If, in the comparison, the blowoff temperature is out of the predetermined temperature range containing the desired temperature, the internal cold storage temperature is needed to be brought close to the desired temperature and, therefore, the normal operation is continued. On the other hand, if the blowoff temperature falls within the predetermined temperature range containing the desired temperature, the internal cold storage temperature is already close to the desired temperature, which eliminates the need to continuously drive the compressor (11). Therefore, a transition from normal operation to energy serving operation is made.

An eleventh aspect of the invention is the refrigeration system according to any one of the first to eighth aspects of the invention, wherein the refrigeration system is configured to be capable of performing a normal operation of driving the compressor (11) while regulating the cooling capacity of the cooling heat exchanger (14) with the capacity regulator (35), and the refrigeration system is further configured to switch from the energy saving operation to the normal operation when during the energy saving operation the time taken in one cycle from the start of the first action to the end of the third action is equal to or shorter than a predetermined period of time.

In the eleventh aspect of the invention, whether a transition from energy saving operation to normal operation should be made or not is determined based on the time taken in one cycle of energy saving operation from the start of the first action to the end of the third action.

Meanwhile, under conditions of significantly high outside temperatures, the internal cold storage temperature is likely to reach the upper limit of the desired temperature range during the third action of the energy saving operation in which the compressor (11) is stopped. Therefore, the time taken in the third action is shortened and, in turn, the time taken in one cycle of energy saving operation is shortened. Hence, if, under such conditions, the energy saving operation is continued, the number of on/off times of the compressor (11) becomes large, resulting in a shortened lifetime of the compressor (11).

In order to cope with this and elongate the lifetime of the compressor (11), in this aspect of the invention, a transition from energy saving operation to normal operation is made when the time taken in one cycle of energy saving operation is short. Specifically, when the time taken in one cycle is above the predetermined set time, the number of on/off times of the compressor (11) is relatively small and, therefore, the energy saving operation is continued. On the other hand, when the time taken in one cycle is equal to or shorter than the predetermined set time, the number of on/off times of the compressor (11) is relatively large and, therefore, a transition from energy saving operation to normal operation is made to continuously drive the compressor (11).

A twelfth aspect of the invention is the refrigeration system according to any one of the first to eighth aspects of the invention, wherein the refrigeration system is configured to prohibit the energy saving operation when the accumulated number of on/off times of the compressor (11) exceeds a predetermined number of times.

In the twelfth aspect of the invention, if the accumulated number of on/off times of the compressor (11) exceeds the predetermined number of times by repeating the on/off operation of the compressor (11), such as owing to the energy saving operation, the energy saving operation is prohibited.

Effects of the Invention

According to the first aspect of the invention, since the compressor (11) is intermittently driven during the energy saving operation, this reduces the operating power of the compressor (11) and in turn enhances the energy saving performance of the refrigeration system.

Particularly in this aspect of the invention, the internal cold storage temperature is once lowered to the lower limit by the second action and the compressor (11) is then stopped. Furthermore, the compressor (11) is held stopped until the internal cold storage temperature reaches the upper limit during the third action. Therefore, according to this aspect of the invention, as compared to the case where the compressor is stopped without once lowering the internal cold storage temperature to the lower limit, the time for the internal cold storage temperature to reach the upper limit can be extended and the compressor can be stopped for an accordingly longer period of time. Hence, the operating power of the compressor (11) during the energy saving operation can be further reduced, thereby effectively reducing the energy consumed by the refrigeration system.

Furthermore, according to this aspect of the invention, since the capacity of the cooling heat exchanger (14) and the on/off operation of the compressor (11) are controlled so that the internal cold storage temperature can change between the upper and lower limits of the desired temperature range, it can be avoided that the internal cold storage temperature deviates from the desired temperature range. Therefore, the interior of the cold storage can be surely cooled also during the energy saving operation, which enhances the reliability of the refrigeration system.

Particularly in the second aspect of the invention, the cooling capacity of the cooling heat exchanger (14) is regulated by regulating the amount of flow of refrigerant to be sucked into the compressor (11) with the flow regulator valve (35). Therefore, refrigerant on the wet side is accumulated in the entire area of the cooling heat exchanger (14), which uniformizes the temperature of air having passed through the cooling heat exchanger (14). In other words, if the cooling capacity of the cooling heat exchanger (14) is regulated by the flow regulator valve (35) as in this aspect of the invention, the controllability of the internal cold storage temperature can be enhanced. As a result, in the first action, the internal cold storage temperature can be promptly and surely brought close to the desired temperature. Furthermore, since during the second action the compressor (11) can be surely stopped at the time when the internal cold storage temperature reaches the lower limit, it can be avoided that during the subsequent third action the internal cold storage temperature falls below the lower limit.

Furthermore, if during the second action the cooling capacity of the cooling heat exchanger were increased by increasing the operating capacity (for example, operating frequency) of the compressor, the power consumption would also increase. Unlike this, in this aspect of the invention, the cooling capacity of the cooling heat exchanger is increased simply by regulating the opening of the flow regulator valve (35) to a larger degree than before. Therefore, the cooling capacity of the cooling heat exchanger (14) can be increased without incurring an increase in the power consumption.

Furthermore, in the third aspect of the invention, the opening of the flow regulator valve (35) at the end of the second action, during which the opening has been regulated to a larger degree than during the first action, is maintained during the third action, i.e., until just before the start of the first action. Therefore, according to this aspect of the invention, a sufficient refrigerant circulation amount can be ensured from the start of the first action at which the internal cold storage temperature reaches the upper limit to restart the compressor (11). Hence, the air in the cold storage can be promptly cooled and the internal cold storage temperature can be avoided from rising above the upper limit.

Furthermore, in the fourth aspect of the invention, when the internal cold storage temperature falls below the lower limit during the third action, the lower limit is corrected to increase. Therefore, in the next and later third actions, the internal cold storage temperature can be avoided from falling below the initial desired temperature range.

Contrariwise, in the fifth aspect of the invention, when the internal cold storage temperature rises above the upper limit during the first action, the upper limit is corrected to decrease. Therefore, in the next and later first actions, the internal cold storage temperature can be avoided from rising above the initial desired temperature range.

Furthermore, in the sixth and eighth aspects of the invention, the internal fan (16) is driven, during the third action, at a lower rotational speed. This restrains the quantity of heat liberated from the internal fan (16) during the third action and extends the stopping period of time of the compressor (11). Hence, the operating power of the compressor (11) during the energy saving operation can be further reduced, thereby further effectively enhancing the energy saving performance of the refrigeration system.

If the internal fan (16) were fully stopped during the third action, the temperature distribution of air in the cold storage might cause variations. In such a case, whether the internal cold storage temperature has reached the upper limit or not, i.e., whether a transition from third to first action should be made or not, could not be correctly determined. Unlike the above case, the refrigeration system according to this aspect of the invention do no more than make the rotational speed of the internal fan (16) lower. Therefore, the temperature variations of the air in the cold storage can be limited to a small range. Hence, according to this aspect of the invention, whether a transition from third to first action should be made or not can be correctly determined, whereby the internal cold storage temperature can be further surely kept within the desired temperature range.

On the other hand, in the case where the internal fan (16) is fully stopped only during the third action as in the seventh aspect of the invention, this eliminates heat liberation from the internal fan (16) during the third action. Therefore, the temperature increase in the cold storage during the third action can be actively restrained. Hence, according to the seventh aspect of the invention, the stopping period of time of the compressor (11) can be extended, thereby effectively reducing the power consumption of the refrigeration system. In addition, the operating power of the internal fan (16) is reduced by a quantity of power corresponding to the period of time during which the internal fan (16) is deactivated during the third action. This further enhances the energy saving performance of the refrigeration system.

Furthermore, in the eighth aspect of the invention, the internal cold storage temperature is changed between the desired temperature and the upper limit during the energy saving operation. Therefore, the internal cold storage temperature can be avoided from deviating from the allowable temperature range, which enhances the reliability of the refrigeration system.

In the ninth and tenth aspects of the invention, whether a transition from normal operation to energy saving operation should be made or not is automatically determined. Particularly in the ninth aspect of the invention, the normal operation is continued until the suction temperature of air in the cold storage before passing through the cooling heat exchanger (14) falls within the desired temperature range. In this case, the suction temperature is a temperature of the air in the cold storage before being cooled by the cooling heat exchanger (14) and, therefore, a temperature close to the actual internal cold storage temperature. Therefore, if whether a transition to the energy saving operation should be made or not is determined based on the suction temperature, the refrigeration system can make a transition to the energy saving operation after it promptly brings the actual internal cold storage temperature close to the desired temperature range. Hence, according to the ninth aspect of the invention, stored goods in the cold storage can be surely cooled within the desired temperature range, which allows the refrigeration system to perform an operation placing great importance on the quality of stored goods.

On the other hand, in the tenth aspect of the invention, the normal operation is continued until the blowoff temperature of air in the cold storage after passing through the cooling heat exchanger (14) falls within the desired temperature range. In this case, the blowoff temperature is a temperature of the air in the cold storage after being cooled by the cooling heat exchanger (14) and, therefore, a temperature slightly lower than the actual internal cold storage temperature. Therefore, if whether a transition to the energy saving operation should be made or not were determined based on the suction temperature, the refrigeration system would make a transition to the energy saving operation at an earlier timing than according to the ninth aspect of the invention. Hence, according to the tenth aspect of the invention, the energy saving operation can be actively carried out, whereby the refrigeration system can perform an operation placing greater importance on energy saving performance.

Furthermore, in the eleventh aspect of the invention, when the time taken in one cycle of energy saving operation is shorter than the predetermined set time, a transition to the normal operation is automatically made. In other words, in this aspect of the invention, when the number of on/off times of the compressor (11) during the energy saving operation is large, a transition from energy saving operation to normal operation is made. Therefore, the number of on/off times of the compressor (11) can be reduced, which provides an elongated lifetime of the compressor (11).

Furthermore, in the twelfth aspect of the invention, when the accumulated number of on/off times of the compressor (11) exceeds the maximum allowable number of on/off times, the refrigeration system prohibits the energy saving operation. Therefore, it can be avoided that the on/off operation of the compressor (11) is repeated in the energy saving operation even though the lifetime of parts of the compressor (11) is shortened. This elongates the lifetime of the compressor (11) and ensures the reliability of the refrigeration system.

LIST OF REFERENCE NUMERALS 1 refrigeration system
10 refrigerant circuit
11 compressor
14 cooling heat exchanger (evaporator)
16 internal fan
35 suction proportional valve (flow regulator valve, capacity regulator)

BEST MODE FOR CARRYING OUT THE INVENTION

An embodiment of the present invention will be described below in detail with reference to the drawings.

Figure 1:
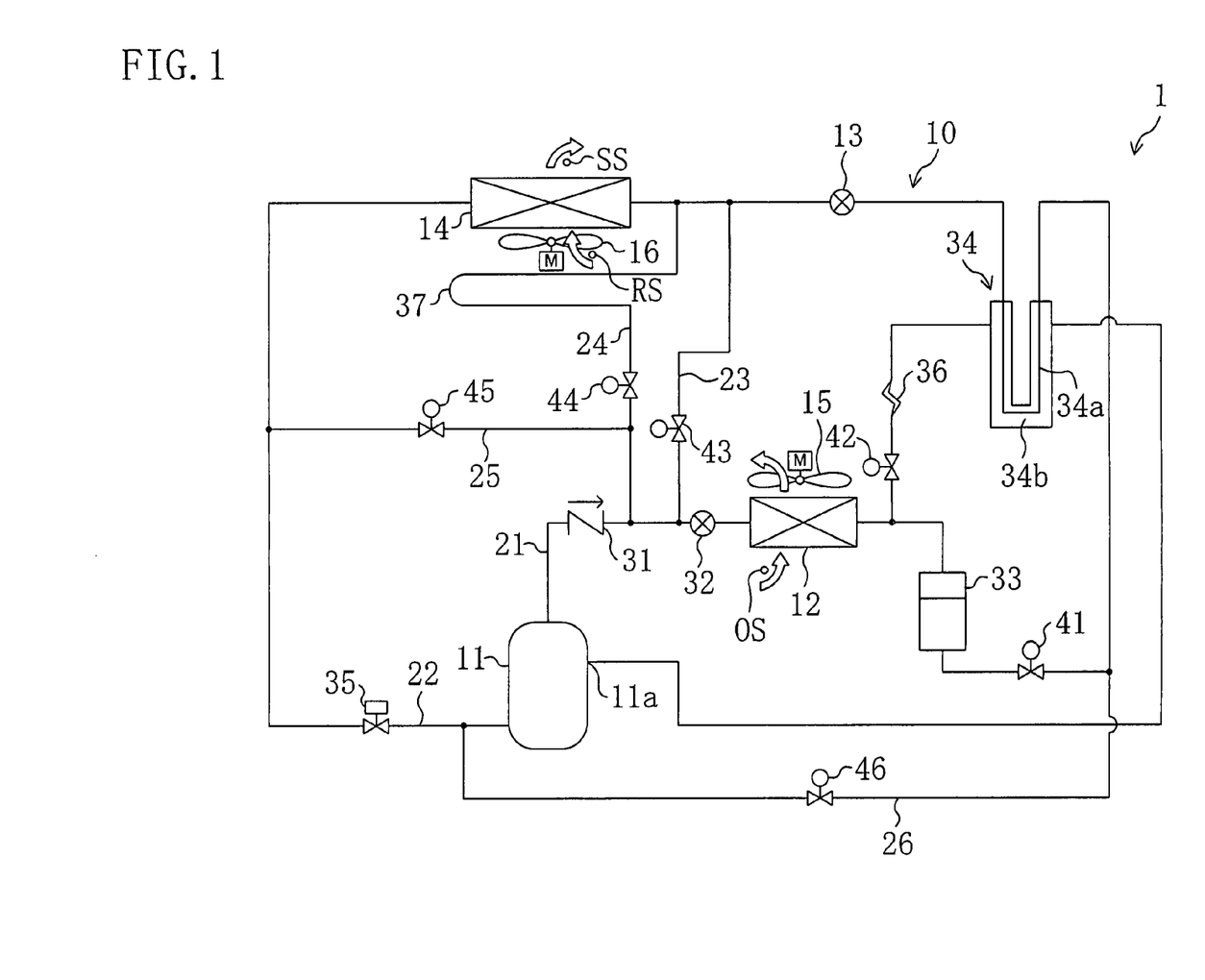
FIG. 1 is a piping diagram showing a schematic configuration of a refrigeration system according to an embodiment.

The refrigeration system (1) of this embodiment is used for cooling the interior of a cold storage in a container for use in sea transport or other transports. The refrigeration system (1) includes a refrigerant circuit (10) operating in a vapor compression refrigeration cycle by circulating refrigerant therethrough.

The refrigerant circuit (10) includes, as main components, a compressor (11), a condenser (12), an expansion valve (13) and an evaporator (14) all connected therein.

The compressor (11) is composed of a fixed displacement scroll compressor whose motor has a constant rotational speed. The condenser (12) is placed outside the cold storage and constitutes a so-called air-cooled condenser. Disposed close to the condenser (12) is an external fan (15) for feeding external air to the condenser (12). Furthermore, the condenser (12) provides heat exchange between refrigerant therein and outside air fed thereto by the external fan (15). Also disposed close to the condenser (12) is an outside temperature sensor (OS). The outside temperature sensor (OS) detects the temperature of the external air (outside air) to be fed to the condenser (12).

The expansion valve (13) is composed of an electronic expansion valve regulatable in opening. The opening of the expansion valve (13) is regulated according to the degree of superheat of refrigerant flowing out of the evaporator (14).

The evaporator (14) is placed in the cold storage in the container and constitutes a cooling heat exchanger for cooling the interior of the cold storage. Disposed close to the evaporator (14) is an internal fan (16) for feeding air in the cold storage in the container to the evaporator (14) while circulating the air in the cold storage. The evaporator (14) provides heat exchange between refrigerant therein and air in the cold storage fed thereto by the internal fan (16). Also disposed close to the evaporator (14) are two temperature sensors. Specifically, a suction temperature sensor (RS) for detecting the temperature of the air in the cold storage to be fed to the evaporator (14) is disposed close to the evaporator (14) and upstream thereof in the flow of the air in the cold storage. On the other hand, a blowoff temperature sensor (SS) for detecting the temperature of the air in the cold storage having passed through the evaporator (14) is disposed close to the evaporator (14) and downstream thereof in the flow of the air in the cold storage.

A discharge pipe (21) of the compressor (11) is connected via a check valve (31) and a discharge pressure regulating valve (32) to the inflow end of the condenser (12). The outflow end of the condenser (12) is connected via a receiver (33), a first solenoid valve (41) and a high-pressure channel (34a) of an economizer heat exchanger (34) to the expansion valve (13). A suction pipe (22) of the compressor (11) is connected via a suction proportional valve (35) to the outflow end of the evaporator (14). The inflow end of the evaporator (14) is connected to the expansion valve (13).

The economizer heat exchanger (34) provides heat exchange between refrigerant flowing through the above-mentioned high-pressure channel (34a) and refrigerant flowing through a low-pressure channel (34b). The inflow end of the low-pressure channel (34b) is connected via a capillary tube (36) and a second solenoid valve (42) to the piping between the condenser (12) and the receiver (33). The outflow end of the low-pressure channel (34b) is connected to an intermediate suction port (11a) of the compressor (11). The intermediate suction port (11a) opens at a midpoint of passage along which refrigerant is compressed in the compression mechanism of the compressor (11).

The suction proportional valve (35) constitutes a flow regulator valve for regulating the refrigerant circulation amount in the refrigerant circuit (10) by regulating the amount of refrigerant to be sucked into the compressor (11). In other words, the suction proportional valve (35) constitutes a capacity regulator for regulating the cooling capacity of the evaporator (14) by regulating the refrigerant circulation amount. The opening of the suction proportional valve (35) is regulated according to the detected temperature of an unshown internal cold storage temperature sensor disposed in the interior of the cold storage in the container.

The refrigerant circuit (10) includes a first defrosting pipe (23), a second defrosting pipe (24), a discharge gas bypass pipe (25) and a liquid injection pipe (26) all of which are connected therein.

The first defrosting pipe (23) and the second defrosting pipe (24) are pipes for a defrosting operation of feeding refrigerant discharged by the compressor (11) to the evaporator (14) to melt frost adhering to the evaporator (14). The first defrosting pipe (23) and the second defrosting pipe (24) are connected at their one-ends to the piping between the check valve (31) and the discharge pressure regulating valve (32) and connected at their other ends to the piping between the expansion valve (13) and the evaporator (14). The first defrosting pipe (23) is provided with a third solenoid valve (43) that are opened during a defrosting operation. The second defrosting pipe (24) is provided with a fourth solenoid valve (44) that are opened during the defrosting operation, and a drain pan heater (37). The drain pan heater (37) is disposed in a drain pan for receiving frost and dew condensation water dropped off from the surface of the evaporator (14) in the cold storage of the container. Therefore, when refrigerant discharged by the compressor (11) flows through the drain pan heater (37) during the defrosting operation, frost and ice blocks of dew condensation water recovered in the drain pan take heat from the refrigerant discharged by the compressor (11) and thereby melt. During the defrosting operation, the discharge pressure regulating valve (32) is set to a fully closed position.

The discharge gas bypass pipe (25) is a pipe for returning the refrigerant discharged by the compressor (11) to the suction side of the compressor (11), such as when the cooling capacity of the evaporator (14) is excessive. The discharge gas bypass pipe (25) serves also as an oil return pipe for returning refrigerating machine oil in the refrigerant discharged from the compressor (11) to the suction side of the compressor (11). The discharge gas bypass pipe (25) is connected at one end to the piping between the check valve (31) and the fourth solenoid valve (44) and connected at the other end to the piping between the evaporator (14) and the suction proportional valve (35). The discharge gas bypass pipe (25) is provided with a fifth solenoid valve (45) that is appropriately opened according to operating conditions.

The liquid injection pipe (26) is a pipe for returning liquid refrigerant obtained by condensation in the condenser (12) to the suction side of the compressor (11), that is, for so-called liquid injection. The liquid injection pipe (26) is connected at one end to the piping between the first solenoid valve (41) and the economizer heat exchanger (34) and connected at the other end to the piping between the suction proportional valve (35) and the compressor (11). The liquid injection pipe (26) is provided with a sixth solenoid valve (46) that is appropriately opened according to operating conditions.

The refrigeration system (1) is provided also with an unshown controller. In the controller, the desired temperature in the interior of the cold storage in the container is set as a set temperature TS. Furthermore, in the controller, upper and lower limits are set as a desired range of internal cold storage temperatures in an energy saving operation mode whose details will be described later. Specifically, set in the controller are a maximum temperature Tmax, which is the upper limit of a desired range of internal cold storage temperatures, and a minimum temperature Tmin, which is the lower limit thereof. Furthermore, the controller is provided with a temperature correction means for correcting the maximum temperature Tmax and the minimum temperature Tmin during the energy saving operation mode.

—Operational Behavior—

The refrigeration system (1) is capable of a freezing operation for freezing stored goods in the cold storage of the container by cooling the internal cold storage temperature below zero degrees Celsius, a chilling operation (chilled operation) for chilling stored goods in the cold storage by cooling the internal cold storage temperature with higher temperatures than zero degrees Celsius and the above-mentioned defrosting operation. Now, a description is given of the chilling operation which is a feature of the present invention.

In the chilling operation, the refrigeration system can operate in a normal operation mode or an energy saving operation mode. The normal operation mode is an operation mode in which the compressor (11) is continuously driven and the air in the cold storage is continuously cooled by the evaporator (14) to chill stored goods in the cold storage. On the other hand, the energy saving operation mode is an operation mode in which the compressor (11) is intermittently driven and the air in the cold storage is semi-continuously cooled by the evaporator (14) to chill stored goods in the cold storage while saving energy of the refrigeration system (1).

<Normal Operation Mode>

Figure 2:
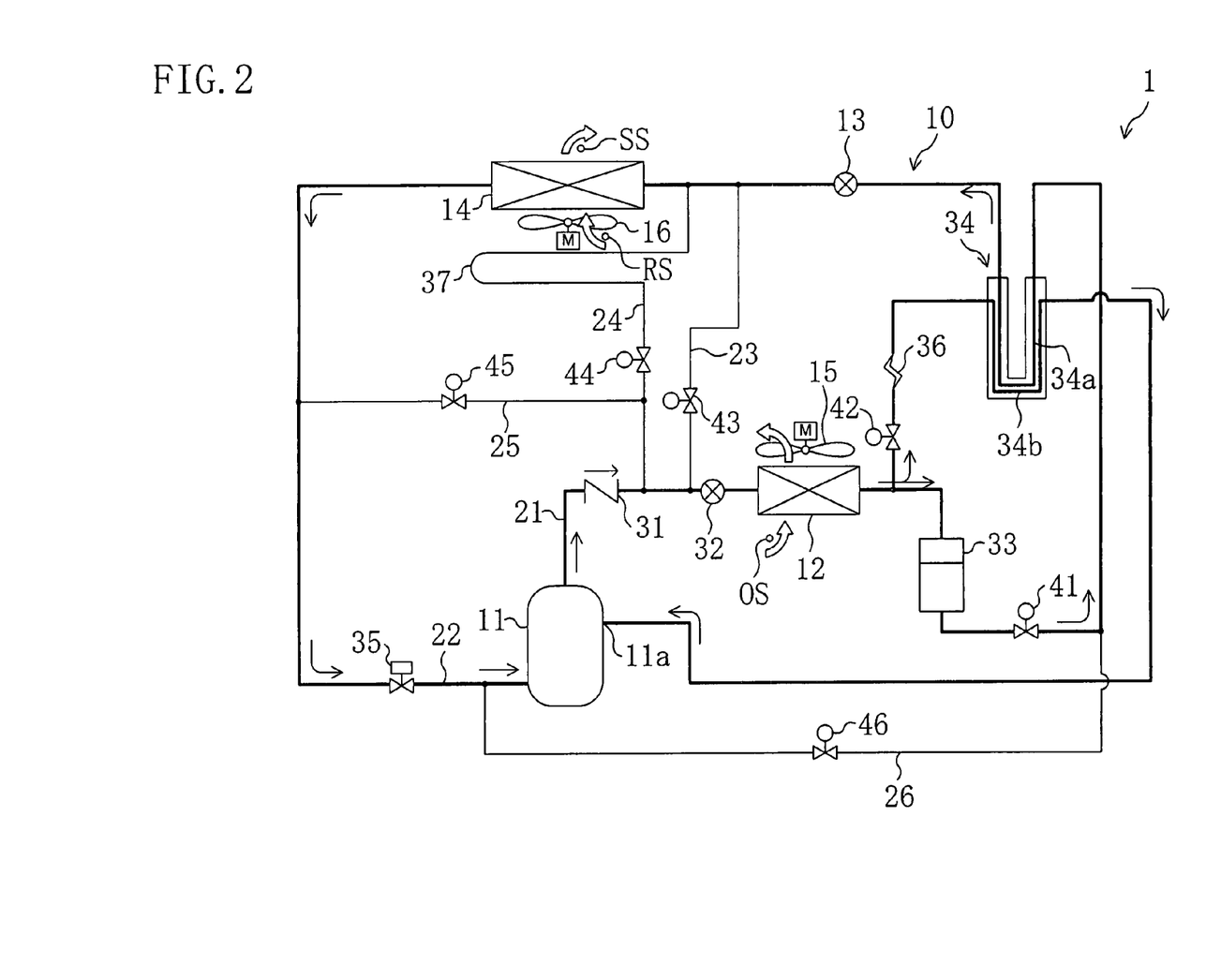
FIG. 2 is a piping diagram showing the refrigerant flow in the refrigeration system according to the embodiment when the refrigeration system is operating.

First, a description is given of the normal operation mode of the refrigeration system (1) with reference to FIG. 2. In the normal operation mode, the compressor (11) is continuously driven and the openings of the expansion valve (13) and the suction proportional valve (35) are appropriately regulated. Furthermore, in the normal operation mode, the first and second solenoid valves (41, 42) are in principle opened, the third to sixth solenoid valves (43, 44, 45, 46) are in principle closed and the external fan (15) and the internal fan (16) are driven at normal rotational speed.

The refrigerant compressed by the compressor (11) flows through the discharge pipe (21) and then into the condenser (12). In the condenser (12), the refrigerant releases heat to the outside air to condense. Thereafter, part of the refrigerant flows via the receiver (33) into the high-pressure channel (34a) of the economizer heat exchanger (34) and the rest is reduced in pressure in the course of passage through the capillary tube (36) and then flows into the low-pressure channel (34b) of the economizer heat exchanger (34).

In the economizer heat exchanger (34), the refrigerant flowing through the low-pressure channel (34b) takes heat from the refrigerant flowing through the high-pressure channel (34a) to evaporate. In other words, the economizer heat exchanger (34) supercools the refrigerant flowing through the high-pressure channel (34a). The refrigerant evaporated in the low-pressure channel (34b) is sucked through the intermediate suction port (11a) into the compressor (11).

The refrigerant supercooled in the high-pressure channel (34a) is reduced in pressure upon passage through the expansion valve (13) and then flows into the evaporator (14). In the evaporator (14), the refrigerant takes heat from the air in the cold storage to evaporate. As a result, the interior of the cold storage in the container is cooled. The refrigerant evaporated in the evaporator (14) passes through the suction proportional valve (35) and is then sucked into the compressor (11).

<Energy Saving Operation Mode>

Figure 3:
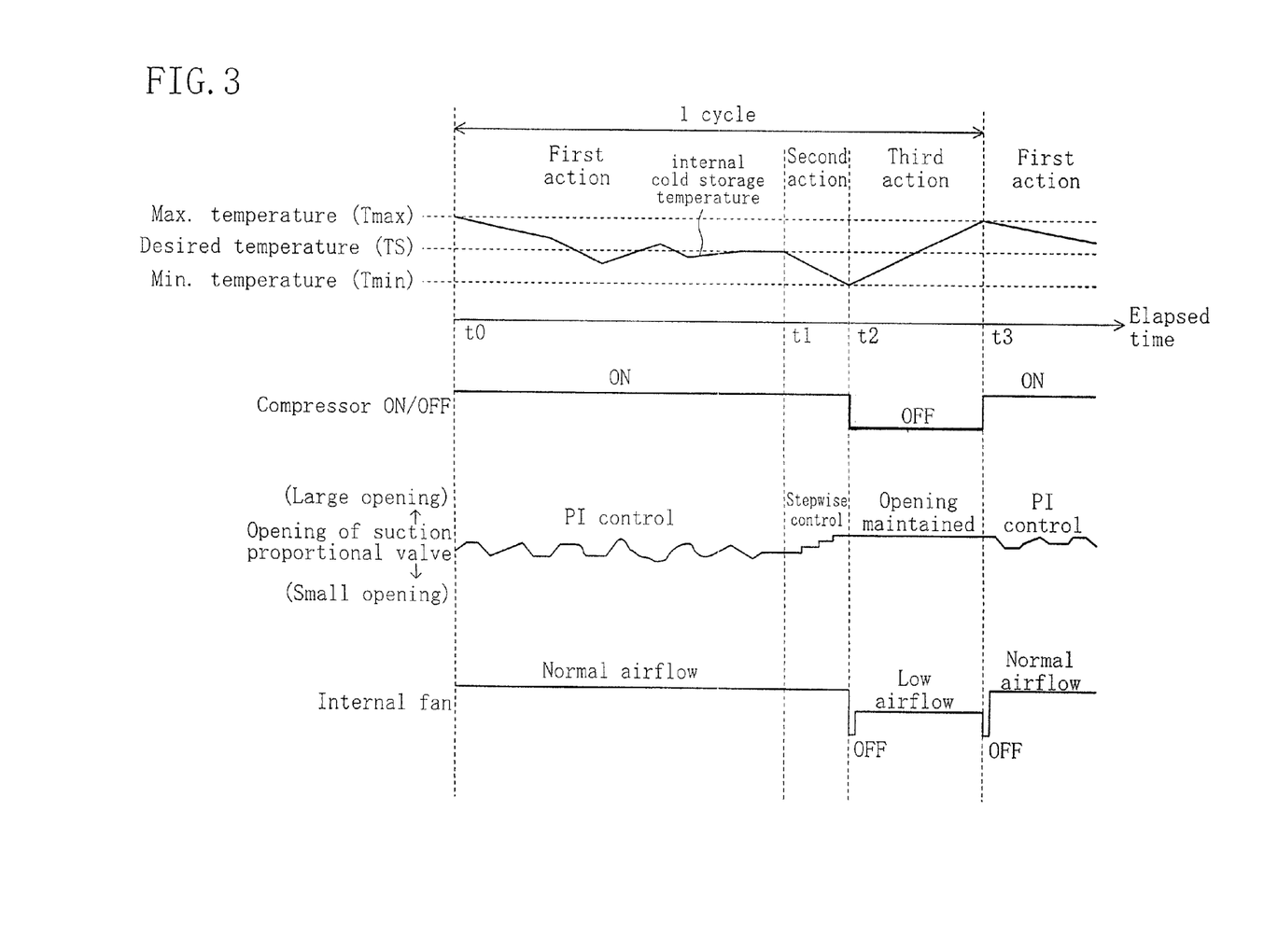
FIG. 3 is a time chart illustrating first to third actions in an energy saving operation mode of the refrigeration system according to the embodiment.

Next, a description is given of the energy saving operation mode of the refrigeration system (1). In the energy saving operation mode, control actions from the first to third as shown in FIG. 3 are repeated by the controller. Note that the principal refrigerant flow in the refrigeration system (1) in the energy saving operation mode is the same as in the normal operation mode.

In the first action, the compressor (11) is driven and the internal fan (16) is driven at a normal rotational speed. Furthermore, during the first action, the cooling capacity of the evaporator (14) is regulated so that the internal cold storage temperature is kept at the set temperature TS.

Specifically, during the first action, the opening of the suction proportional valve (35) is regulated by PI control based on the set temperature TS and the detected temperature of the internal cold storage temperature sensor. As a result, the refrigerant circulation amount in the refrigerant circuit (10) is regulated according to the opening of the suction proportional valve (35), whereby the cooling capacity of the evaporator (14) is also regulated.

When the cooling capacity of the evaporator (14) is regulated while the opening of the suction proportional valve (35) is throttled in the above manner, refrigerant is likely to become wet over the entire area of the evaporator (14). If the cooling capacity of the evaporator were regulated by regulating the opening of the electronic expansion valve on the inflow side of the evaporator, refrigerant flowing through the evaporator would be on the dry side and would be likely to cause temperature variations from inflow end to outflow end of the evaporator. On the other hand, when the cooling capacity of the evaporator (14) is regulated while the opening of the suction proportional valve (35) is throttled, this uniformizes the temperature distribution of refrigerant from inflow end to outflow end of the evaporator (14). As a result, the air in the cold storage can be relatively uniformly cooled, thereby enhancing the controllability of internal cold storage temperature by the evaporator (14).

After the first action, the second action is carried out. Note that in this embodiment a transition from first to second action is made when a time set in the controller has passed since a first action start point t0 in time. The set time is a period of time long enough to keep the internal cold storage temperature at the set temperature TS by cooling of the evaporator (14) and, in this embodiment, it is approximately two minutes. Specifically, in the energy saving operation mode, when two minutes has passed since the time point t0 and a time point t1 at which it is determined that the internal cold storage temperature is surely kept at the desired temperature has come, a transition from first to second action is made.

In the second action, as time passes since the time point t1, the cooling capacity of the evaporator (14) is gradually increased and accordingly the internal cold storage temperature is gradually decreased. Specifically, in the second action, the compressor (11) continues to be driven and the internal fan (16) is still driven at the normal rotational speed. In contrast to the first action, in the second action, the opening of the suction proportional valve (35) is regulated to become gradually larger since the time point t1. As a result, the refrigerant circulation amount in the refrigerant circuit (10) gradually increases and the cooling capacity of the evaporator (14) also gradually increases.

When the internal cold storage temperature decreases to the minimum temperature Tmin by the above regulation of the opening of the suction proportional valve (35), a transition from second to third action is made. In other words, the third action is started from a time point t2 at which the internal cold storage temperature reaches the minimum temperature Tmin. Note that the opening of the suction proportional valve (35) is regulated stepwise to increase 10% every 10 seconds after the time point t1. As a result, the internal cold storage temperature relatively slowly decreases, which avoids that after the transition from second to third action, the internal cold storage temperature falls below the minimum temperature Tmin, i.e., a so-called undershoot occurs.

In the third action, the compressor (11) is immediately stopped. As a result, the refrigeration cycle in the refrigerant circuit (10) is stopped to substantially stop the evaporator (14) cooling the interior of the cold storage, whereby the internal cold storage temperature gradually rises. Furthermore, during the third action, the internal fan (16) is driven at a smaller rotational speed than the normal rotational speed. When, as described above, the rotational speed of the internal fan (16) is lower than those during the first and second actions, the quantity of heat due to rotation of the internal fan (16) is reduced, whereby the rate of increase in internal cold storage temperature during the third action is also reduced. In changing the rotational speed of the internal fan (16), in order to reduce an abrupt torque variation of the internal fan (16), the internal fan (16) is once stopped and then immediately driven at a low rotational speed. Furthermore, during the third action, the opening of the suction proportional valve (35) is held as it is at the end of the second action (the time point t2).

When the internal cold storage temperature gradually rises and then reaches the maximum temperature Tmax by the above third action, a transition from third to first action is made. In other words, the first action is started from a time point t3 at which the internal cold storage temperature reaches the maximum temperature Tmax. As a result, the compressor (11) is driven again and the internal fan (16) is driven at the normal rotational speed. Furthermore, the opening of the suction proportional valve (35) held during the third action is adopted as an initial opening in the first action and, then, the opening of the suction proportional valve (35) is regulated by PI control based on the set temperature TS and the detected temperature of the internal cold storage temperature sensor. Therefore, the opening of the suction proportional valve (35) at the start of the first action is the same as that at the end of the second action during which the cooling capacity of the evaporator (14) has been increased to cool the air in the cold storage. As a result, the refrigerant circulation amount is ensured from the start of the first action at which the internal cold storage temperature reaches the maximum temperature Tmax to restart the compressor (11) and the air in the cold storage is then rapidly cooled to gradually approach the desired temperature again.

<Learning Control on Maximum Temperature and Internal Cold Storage Temperature>

In the energy saving operation mode, for example, under conditions of relatively low outside temperatures, the internal cold storage temperature is likely to drop when the cooling capacity of the evaporator (14) is increased during the second action. Therefore, even if during the second action the internal cold storage temperature reaches the minimum temperature Tmin to provide a transition to the third action, the internal cold storage temperature may fall below the minimum temperature Tmin. On the other hand, under conditions of relatively high outside temperatures, the internal cold storage temperature is likely to rise when the compressor (11) is stopped during the third action. Therefore, even if during the third action the internal cold storage temperature reaches the maximum temperature Tmax to provide a transition to the first action, the internal cold storage temperature may rise above the maximum temperature Tmax. In order to avoid that the internal cold storage temperature deviates from the desired temperature range owing to the above outside temperature conditions, the refrigeration system (1) of this embodiment executes the following learning control in the energy saving operation mode.

In the energy saving operation mode, whether the internal cold storage temperature falls below the minimum temperature Tmin or not is determined during a predetermined determination period of time (for example, 60 seconds) since the third action start point (time point t2). Specifically, when the internal cold storage temperature falls below the minimum temperature Tmin during the above determination period of time under relatively low outside temperature conditions, the controller detects this and sets a flag. Note that even if the internal cold storage temperature falls below the minimum temperature Tmin several times during the determination period of time of 60 seconds, the flag is turned on only once. Furthermore, when the internal cold storage temperature does not fall below the minimum temperature Tmin during a determination period of time of 60 seconds in the third action of the next cycle, the flag is reset. Furthermore, when the energy saving operation is continuously carried out and the flag is thereby turned on three times one after another, the temperature correction means of the controller corrects the minimum temperature Tmin to raise it. According to this correction of the temperature correction means, if the current minimum temperature Tmin is, for example, 4.5° C., the temperature, 4.6° C., which is a value obtained by adding a correction value, 0.1° C., to Tmin, is set as an updated minimum temperature Tmin'. As a result, when the internal cold storage temperature reaches the corrected minimum temperature Tmin' (4.6° C.) during the second action of a cycle after the correction, a transition to the third action is made. Therefore, it can be avoided that the internal cold storage temperature falls below the minimum temperature Tmin (4.5° C.) that is the lower limit of the initial desired temperature range.

Furthermore, in the energy saving operation mode, whether the internal cold storage temperature rises above the maximum temperature Tmax or not is determined during a predetermined determination period of time (for example, 30 seconds) since the point of transition from the third action to the first action (time point t3). Specifically, when the internal cold storage temperature rises above the maximum temperature Tmax during the above determination period of time under relatively high outside temperature conditions, the controller detects this and sets a flag. Note that even if the internal cold storage temperature rises above the maximum temperature Tmax several times during the determination period of time of 30 seconds, the flag is turned on only once. Furthermore, when the internal cold storage temperature does not rise above the maximum temperature Tmax during a determination period of time of 30 seconds in the third action of the next cycle, the flag is reset. Furthermore, when the energy saving operation is continuously carried out and the flag is thereby turned on three times one after another, the temperature correction means of the controller corrects the maximum temperature Tmax to lower it. According to this correction of the temperature correction means, if the current maximum temperature Tmax is, for example, 5.5° C., the temperature 5.4° C., which is a value obtained by subtracting a correction value, 0.1° C., from Tmax, is set as an updated maximum temperature Tmax'. As a result, when the internal cold storage temperature reaches the corrected maximum temperature Tmax' (5.4° C.) during the third action of a cycle after the correction, a transition to the first action is made. Therefore, it can be avoided that the internal cold storage temperature rises above the maximum temperature Tmax (5.5° C.) that is the upper limit of the initial desired temperature range.

However, particularly under conditions of significantly high outside temperatures, it can be inferred that even if the above learning control has been carried out, the internal cold storage temperature may rise above the maximum temperature Tmax. Therefore, if the flag is turned on five times one after another since the determination period of time of 30 seconds after the start of the first action, the operation mode is automatically switched from the energy saving operation mode to the above-mentioned normal operation mode. As a result, under such conditions of significantly high outside temperatures, the internal cold storage temperature is surely kept at the desired temperature by the normal operation mode.

<Automatic Switch Control Between Normal Operation and Energy Saving Operation>

Furthermore, the refrigeration system of this embodiment automatically switches the operation mode between normal operation and energy saving operation in the following manner.

Figure 4:
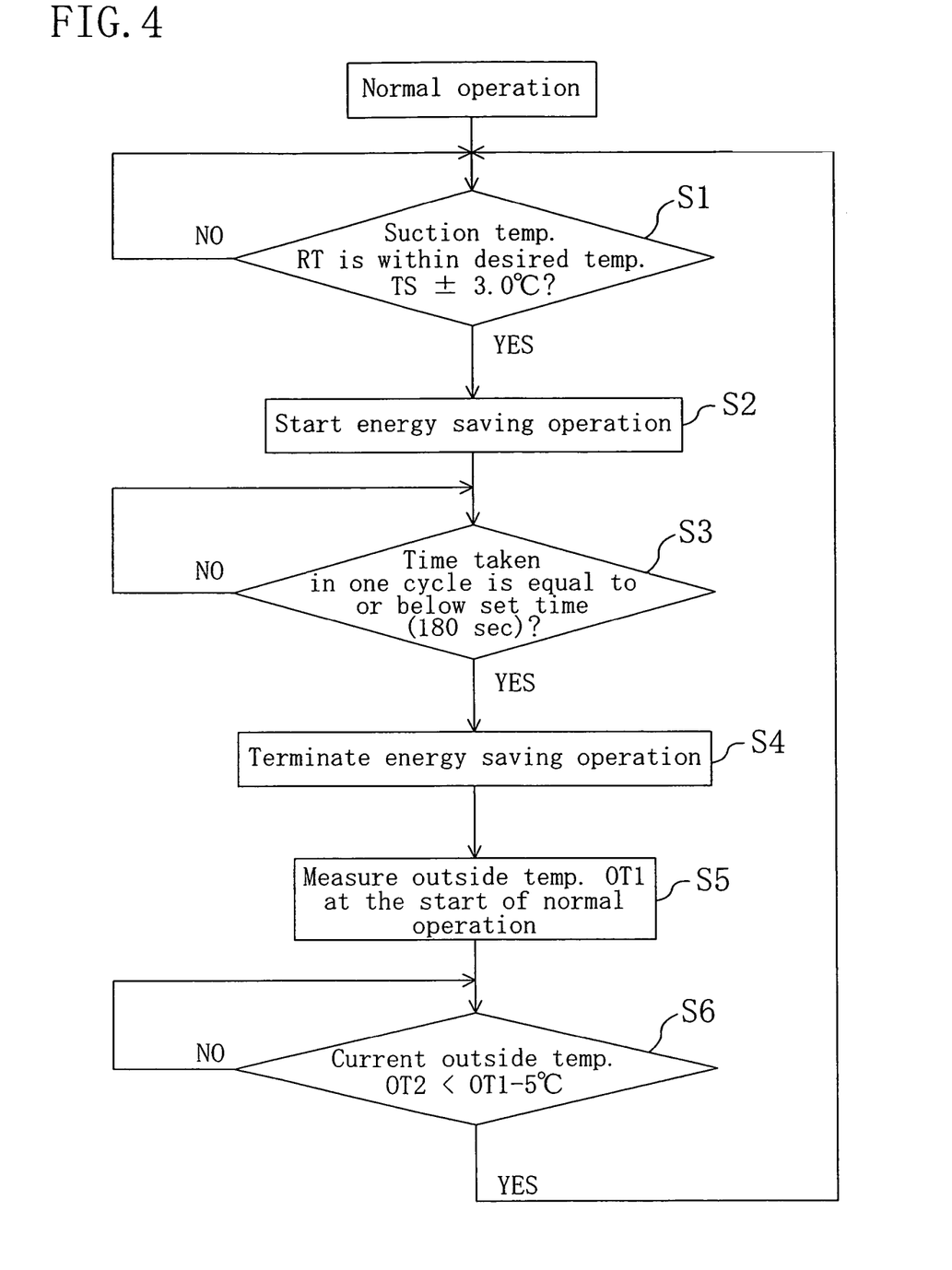
FIG. 4 is a control flow chart illustrating control on switching between a normal operation mode and an energy saving operation mode of the refrigeration system according to the embodiment.

As shown in FIG. 4, the normal operation is first carried out and, in the subsequent step S1, a comparison is made between the suction temperature RT detected by the suction temperature sensor (RS) and the desired temperature TS in the interior of the cold storage. If, in the comparison, the suction temperature RT is beyond the range of desired temperature TS±3.0° C., the internal cold storage temperature is needed to be promptly brought close to within the desired temperature range and, therefore, the normal operation is continued. On the other hand, if the suction temperature RT falls within the range of desired temperature TS±3.0° C., the internal cold storage temperature is already kept within the desired temperature range, which eliminates the need to continuously drive the compressor (11). Therefore, the control proceeds to step S2 and, in step S2, the energy saving operation is carried out.

In the energy saving operation, the time taken in one cycle from the start of the first action to the end of the third action is measured. Then, in step S3, a comparison is made between the time taken in one cycle and the predetermined set time (for example, 180 seconds).

Meanwhile, when the compressor (11) is stopped in the third action under conditions of significantly high outside temperatures, the time until the air in the cold storage having the minimum temperature Tmin as shown in FIG. 3 reaches the maximum temperature Tmax (t3–t2) is extremely shortened, which shortens also the time taken in one cycle of energy saving operation. Therefore, if, under such conditions, the energy saving operation is continued, the number of on/off times of the compressor (11) becomes large, resulting in a shortened lifetime of the compressor (11). To cope with this, if the outside temperature is significantly high and the time taken in one cycle is determined to be shorter than the set time in step S3, the energy saving operation is terminated (step S4) and the normal operation is then restarted (step S5). As a result, the compressor (11) is continuously driven, thereby elongating the lifetime of the compressor (11).

Furthermore, in step S5, concurrently with the start of the normal operation, the outside temperature OT1 at that time is measured by the outside temperature sensor (OS). Thereafter, in step S6, the current outside temperature OT2 is appropriately measured since immediately after the start of the normal operation. Thus, if the current outside temperature OT2 is a predetermined set temperature (for example, 5° C.) or more lower than the outside temperature OT1 at the start of the normal operation, it is assumed that the outside temperature has dropped 5° C. or more since the end of the previous energy saving operation and the energy saving operation can be restarted. Therefore, the control goes back to step S1 and whether the energy saving operation should be started or not is determined therein. On the other hand, if the current outside temperature OT2 is not a set temperature or more lower than the outside temperature OT1 at the start of the normal operation, it is assumed that the outside temperature is still high and unsuitable for the energy saving operation. Therefore, the control does not go to step S1.

Note that in the refrigeration system (1), the above-described defrosting operation is carried out periodically (for example, every four hours) irrespective of the operation mode. Therefore, after the defrosting operation, the normal operation is carried out and whether the energy saving operation should be started or not is determined in step S1.

<Prohibitive Control of Energy Saving Operation>

Furthermore, in the refrigeration system of this embodiment, when the accumulated number of on/off times of the compressor (11) exceeds a predetermined set number of times, such as owing to the energy saving operation, only the normal operation is allowed and the energy saving operation is prohibited. Specifically, the refrigeration system successively counts the number of ON/OFF times of a magnet switch for on/off control of the compressor (11). In this case, a time the magnet switch has been turned from OFF to ON is counted as one on/off time. On the other hand, in the controller, a predetermined maximum allowable number of on/off times (for example, 200000 times) is set according to the specification of the compressor (11). Thus, if the number of on/off times of the compressor (11) exceeds 200000, such as owing to the above energy saving operation, the energy saving operation is prohibited and only the normal operation can be carried out.

Effects of Embodiment

According to the above embodiment, the following effects are exhibited.

According to the above embodiment, since the compressor (11) is intermittently driven during the energy saving operation mode, this reduces the operating power of the compressor (11) and in turn enhances the energy saving performance of the refrigeration system (1).

Particularly in the energy saving operation mode in the above embodiment, as shown in FIG. 3, the internal cold storage temperature is once lowered to the minimum temperature Tmin by the second action and the compressor (11) is then stopped. Therefore, the period of the third action until the internal cold storage temperature reaches the maximum temperature Tmax after the stop of the compressor (11) can be extended, whereby the operating time of the compressor (11) during the energy saving operation mode can be effectively reduced. Hence, the operating power of the compressor (11) during the energy saving operation mode can be reduced to a great extent and, in turn, the energy saving performance of the refrigeration system (1) can be effectively enhanced.

Furthermore, in the energy saving operation mode, the capacity of the evaporator (14) and the on/off switching of the compressor (11) are controlled so that the internal cold storage temperature changes within the allowable temperature range between the minimum temperature Tmin, i.e., the lower limit of the allowable temperature range, and the maximum temperature Tmax, i.e., the upper limit thereof. Therefore, it can be avoided that in the energy saving operation mode, the internal cold storage temperature deviates from the allowable temperature range. This enhances the reliability of the refrigeration system (1).

Furthermore, in the above embodiment, the cooling capacity of the evaporator (14) is regulated by regulating the opening of the suction proportional valve (35). When the cooling capacity of the evaporator (14) is thus regulated while the opening of the suction proportional valve (35) is regulated, the refrigerant becomes on the wet side over the entire area of the evaporator (14). Therefore, the air in the cold storage can be relatively uniformly cooled by the evaporator (14). As a result, in the first action of the energy saving operation mode, the internal cold storage temperature can be promptly and surely brought close to the desired temperature. Furthermore, since during the second action the compressor (11) can be surely stopped at the time when the internal cold storage temperature reaches the lower limit, it can be avoided that during the subsequent third action the internal cold storage temperature falls below the lower limit.

Furthermore, in the second action, even if the cooling capacity of the evaporator (14) is increased by regulating the opening of the suction proportional valve (35), the operating capacity of the compressor (11) does not change. Therefore, in the second action, the cooling capacity of the evaporator (14) can be increased without increasing the operating power of the compressor (11). Hence, the energy saving performance of the refrigeration system (1) can be further enhanced.

Furthermore, in the above embodiment, the internal fan (16) is driven, during the third action, at a lower rotational speed than during the first and second actions. Therefore, during the third action, the quantity of heat owing to driving of the motor for the internal fan (16) can be reduced. Hence, the period of the third action until the internal cold storage temperature reaches the maximum temperature Tmax after the stop of the compressor (11) can be extended. This extends the stopping period of time of the compressor (11) and in turn further enhances the energy saving performance of the refrigeration system (1).

Furthermore, in the energy saving operation mode in the above embodiment, the refrigeration system carries out a so-called learning control of correcting the maximum temperature Tmax and the minimum temperature Tmin based on the internal cold storage temperature. Therefore, the internal cold storage temperature can be avoided from falling below the minimum temperature Tmin and rising above the maximum temperature Tmax, whereby the internal cold storage temperature can be surely avoided from deviating from the allowable temperature range also in the energy saving operation mode. Hence, the reliability of the refrigeration system (1) can be further enhanced.

Furthermore, in the above embodiment, whether a transition from normal to energy saving operation should be made or not is determined based on the suction temperature (RT) of the air in the cold storage before flowing into the cooling heat exchanger (14). Then, the normal operation is continued until the suction temperature RT falls within the desired temperature range. In this case, the suction temperature RT is a temperature of the air in the cold storage before being cooled by the cooling heat exchanger (14) and, therefore, a temperature close to the actual internal cold storage temperature. Therefore, if whether a transition from normal to energy saving operation should be made or not is determined based on the suction temperature RT, the refrigeration system can make a transition to the energy saving operation after it promptly brings the actual internal cold storage temperature within the desired temperature range. Hence, stored goods in the cold storage can be surely cooled within the desired temperature range, which allows the refrigeration system (1) to perform an operation placing great importance on the quality of stored goods.

On the other hand, in the above embodiment, when the time taken in one cycle of energy saving operation is shorter than the predetermined set time, a transition to the normal operation is automatically made. In other words, in the above embodiment, when the number of on/off times of the compressor (11) during the energy saving operation is large, a transition from energy saving operation to normal operation is made. Therefore, the number of on/off times of the compressor (11) can be reduced, which provides an elongated lifetime of the compressor (11).

<Other Control Manners>

The refrigeration system (1) of the above embodiment may carry out the following controls.

In the above embodiment, in the third action in which the compressor (11) is stopped, the quantity of heat liberated from the internal fan (16) is reduced by driving the internal fan (16) at a low speed. However, in the third action, the internal fan (16) may be fully deactivated. In this case, since no heat is liberated from the fan motor of the internal fan (16) during the third action, this actively restrains temperature increase in the cold storage during the third action. Therefore, the stopping period of time of the compressor (11) can be further extended, which effectively reduces the power consumption of the refrigeration system (1). In addition, the operating power of the internal fan (16) is also reduced by a quantity of power corresponding to the period of time during which the internal fan (16) is deactivated during the third action. This further enhances the energy saving performance of the refrigeration system (1).

In the energy saving operation mode in the above embodiment, the cooling capacity of the evaporator (14) is gradually increased during the second action by stepwise making the opening of the suction proportional valve (35) larger. However, the cooling capacity of the evaporator (14) may be increased by a control of increasing the opening of the suction proportional valve (35) to twice immediately after the start of the second action or by a PI control aiming at the minimum temperature Tmin based on the detected value of the internal cold storage temperature sensor.

Furthermore, in the energy saving operation mode in the above embodiment, the minimum temperature Tmin is set, the internal cold storage temperature is once lowered to the minimum temperature Tmin during the second action and the compressor (11) is then stopped. However, the compressor (11) may be stopped without lowering the internal cold storage temperature during the second action. In this case, the third action is terminated when the internal cold storage temperature reaches from the set temperature TS to the maximum temperature Tmax after the stop of the compressor (11). Therefore, the stopping period of time of the compressor (11) can be shortened as compared to the above embodiment. However, also in this case, the quantity of heat due to driving of the internal fan (16) during the third action can be reduced by driving the internal fan (16) at a lower rotational speed than during the first action, thereby reducing the rate of increase in the internal cold storage temperature during the third action. Hence, also in this case, the stopping period of time of the compressor (11) can be extended, whereby the energy of the refrigeration system (1) can be saved by the power reduction of the compressor (11).

Furthermore, in the energy saving operation mode in the above embodiment, the opening of the suction proportional valve (35) at the end of the second action is maintained until the end of the third action, i.e., the start of the first action. However, during the third action, the opening of the suction proportional valve (35) may be fixed to a predetermined opening independent of the opening at the end of the second action or may be regulated, for example, according to the internal cold storage temperature.

Furthermore, in the energy saving operation mode in the above embodiment, the suction proportional valve (35) is used as a capacity regulator for regulating the cooling capacity of the evaporator (14). However, the cooling capacity of the evaporator (14) can be regulated, for example, by regulating the opening of the electronic expansion valve upstream of the evaporator (14) or regulating the capacity of the compressor.

Furthermore, in the above embodiment, whether a transition from normal to energy saving operation should be made or not is determined based on the suction temperature RT of the air in the cold storage to be fed into the cooling heat exchanger (14). However, when the blowoff temperature ST of the air in the cold storage after passing through the cooling heat exchanger (14) is detected by the blowoff temperature sensor (SS) and the blowoff temperature ST falls within a predetermined set temperature range including a desired temperature, a transition from normal to energy saving operation may be made. The blowoff temperature ST is slightly lower than the suction temperature RT. Therefore, in this case, the timing of transition from normal to energy saving operation is advanced as compared to the above embodiment. In other words, in this case, the energy saving operation is carried out with a higher frequency than in the above embodiment. Therefore, the refrigeration system (1) in this case can perform an operation placing greater importance on energy saving performance.

Furthermore, in the above embodiment, when the time taken in one cycle of energy saving operation from the start of the first action to the end of the third action is beyond the predetermined set time, a transition to the normal operation is made. However, when during the energy saving operation the time taken in the third action in which the compressor (11) is stopped becomes longer than a predetermined set time, a transition to the normal operation may be made. Also in this case, the number of on/off times of the compressor (11) can be reduced, thereby providing an elongated lifetime of the compressor (11).

The above embodiments are merely preferred embodiments in nature and are not intended to limit the scope, applications and use of the invention.

INDUSTRIAL APPLICABILITY

As can be seen from the above description, the present invention is useful for a method for energy saving operation of a refrigeration system with a cooling heat exchanger for cooling the interior of a cold storage.

The invention claimed is:

1. A refrigeration system, including:
a refrigerant circuit in which a compressor and a cooling heat exchanger for cooling the interior of a cold storage are connected, the refrigeration system operating in a refrigeration cycle by circulating refrigerant through the refrigerant circuit; and
a capacity regulator for regulating the cooling capacity of the cooling heat exchanger to bring the internal cold storage temperature to a desired temperature, wherein
the capacity regulator is configured to perform energy saving operation including:
operating the refrigeration system in a first mode in which the compressor is driven while the cooling capacity of the cooling heat exchanger is regulated by the capacity regulator,
operating the refrigeration system in a second mode in which when the internal cold storage temperature is held at the desired temperature during the first mode, the cooling capacity of the cooling heat exchanger is increased by the capacity regulator to lower the internal cold storage temperature to a lower limit of a desired temperature range containing the desired temperature and the compressor is then stopped and
operating the refrigeration system in a third mode in which the compressor remains stopped, and when the internal cold storage temperature reaches an upper limit of the desired temperature range after the stop of the compressor by the second mode, the compressor is activated to restart the first mode.

2. The refrigeration system of claim 1, wherein
the capacity regulator comprises a flow regulator valve, connected in the refrigerant circuit, for regulating the amount of flow of refrigerant to be sucked into the compressor, and
the refrigeration system during the second mode is configured to make the opening of the flow regulator valve larger to increase the cooling capacity of the cooling heat exchanger.

3. The refrigeration system of claim 2, wherein during the third mode the opening of the flow regulator valve is held as it is at the end of the second mode.

4. The refrigeration system of claim 1, further including a temperature correction means for raising the lower limit when the internal cold storage temperature falls below the lower limit during the third mode.

5. The refrigeration system of claim 1, further including a temperature correction means for lowering the upper limit when the internal cold storage temperature rises above the upper limit during the first mode.

6. The refrigeration system of claim 1, further including an internal fan, contained in the cold storage, for feeding air to the cooling heat exchanger, the internal fan being rotated during the third mode at a lower speed than during the first and second modes.

7. The refrigeration system of claim 1, further including an internal fan, contained in the cold storage, for feeding air to the cooling heat exchanger, the internal fan being deactivated only during the third mode.

8. The refrigeration system of claim 1, wherein
the refrigeration system is configured to perform a normal operation of continuously driving the compressor while regulating the cooling capacity of the cooling heat exchanger with the capacity regulator,
the refrigeration system further includes a suction temperature sensor for detecting the temperature of air in the cold storage to be fed to the cooling heat exchanger, and
the refrigeration system is further configured to switch from the normal operation to the energy saving operation when during the normal operation the detected temperature of the suction temperature sensor falls within a predetermined temperature range containing the desired temperature.

9. The refrigeration system of claim 1, wherein
the refrigeration system is configured to perform a normal operation of continuously driving the compressor while regulating the cooling capacity of the cooling heat exchanger with the capacity regulator,
the refrigeration system further includes a blowoff temperature sensor for detecting the temperature of air in the cold storage having passed through the cooling heat exchanger, and
the refrigeration system is further configured to switch from the normal operation to the energy saving operation when during the normal operation the detected temperature of the blowoff temperature sensor falls within a predetermined temperature range containing the desired temperature.

10. The refrigeration system of claim 1, wherein
the refrigeration system is configured to perform a normal operation of driving the compressor while regulating the cooling capacity of the cooling heat exchanger with the capacity regulator, and
the refrigeration system is further configured to switch from the energy saving operation to the normal operation when during the energy saving operation the time taken in one cycle from the start of the first mode to the end of the third mode is equal to or shorter than a predetermined period of time.

11. The refrigeration system of claim 1, wherein the refrigeration system is configured to prohibit the energy saving operation when the accumulated number of on/off times of the compressor exceeds a predetermined number of times.

12. A refrigeration system, including;
a refrigerant circuit in which a compressor and a cooling heat exchanger for cooling the interior of a cold storage are connected, the refrigeration system operating in a refrigeration cycle by circulating refrigerant through the refrigerant circuit;
a capacity regulator for regulating the cooling capacity of the cooling heat exchanger to bring the internal cold storage temperature to a desired temperature; and
an internal fan, contained in the cold storage, for feeding air to the cooling heat exchanger, wherein
the capacity regulator is configured to operate the refrigeration system in a first mode in which the compressor is driven while the cooling capacity of the cooling heat exchanger is regulated by the capacity regulator,
the capacity regulator is configured to operate the refrigeration system in a second mode in which when the internal cold storage temperature is held at the desired temperature during the first mode, the compressor is stopped, and
the capacity regulator is configured to operate the refrigeration system in a third mode in which the compressor remains stopped, the internal fan rotates at a lower speed than during the first mode, and when the internal cold storage temperature reaches an upper limit of a desired temperature range containing the desired temperature after the stop of the compressor by the second mode, the compressor is activated to restart the first mode.

\* \* \* \* \*